N. LAPPAS.
AUTOMATIC POULTRY FEEDER.
APPLICATION FILED NOV. 13, 1916.
1,219,114.
Patented Mar. 13, 1917.
3 SHEETS—SHEET 2.
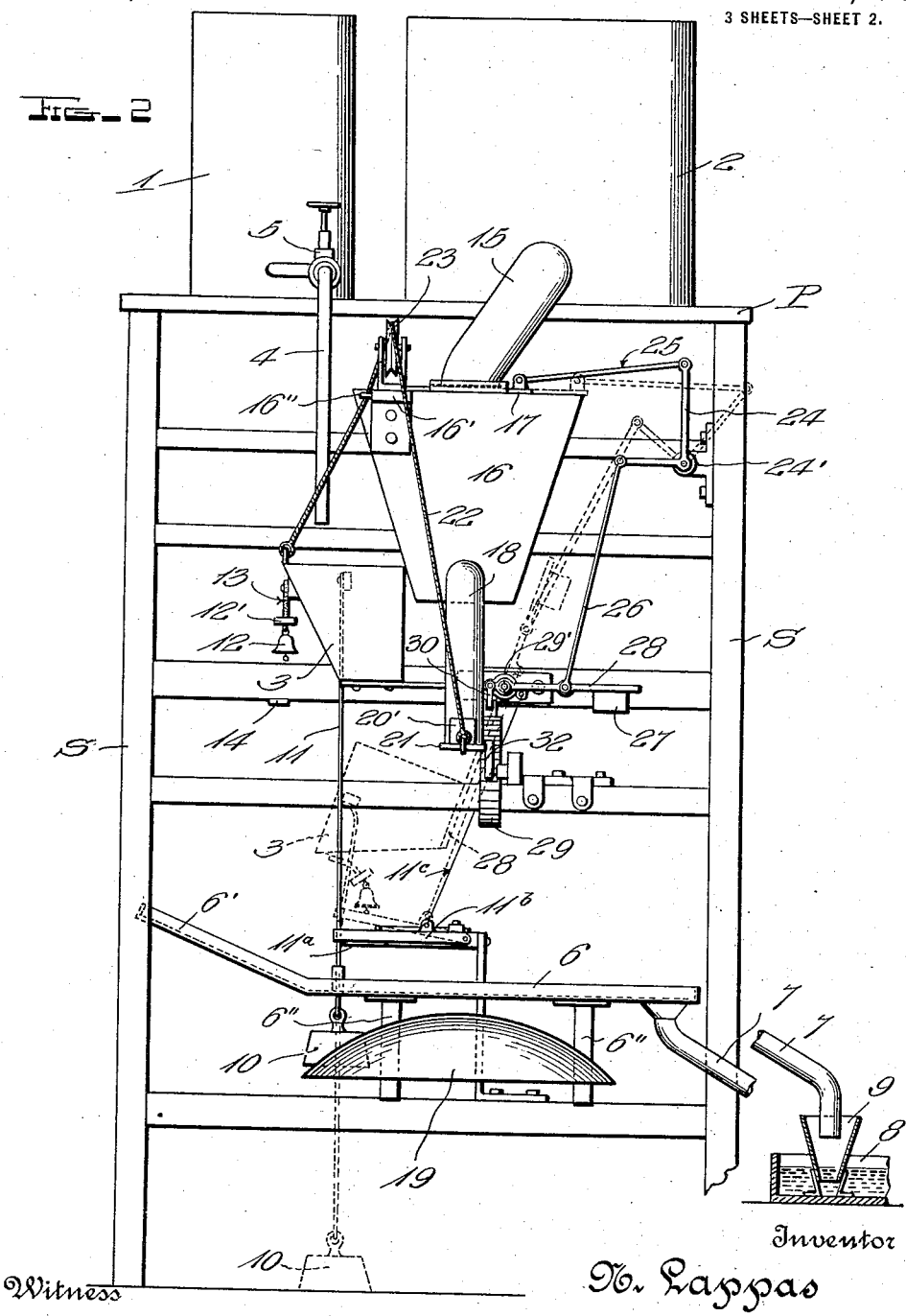

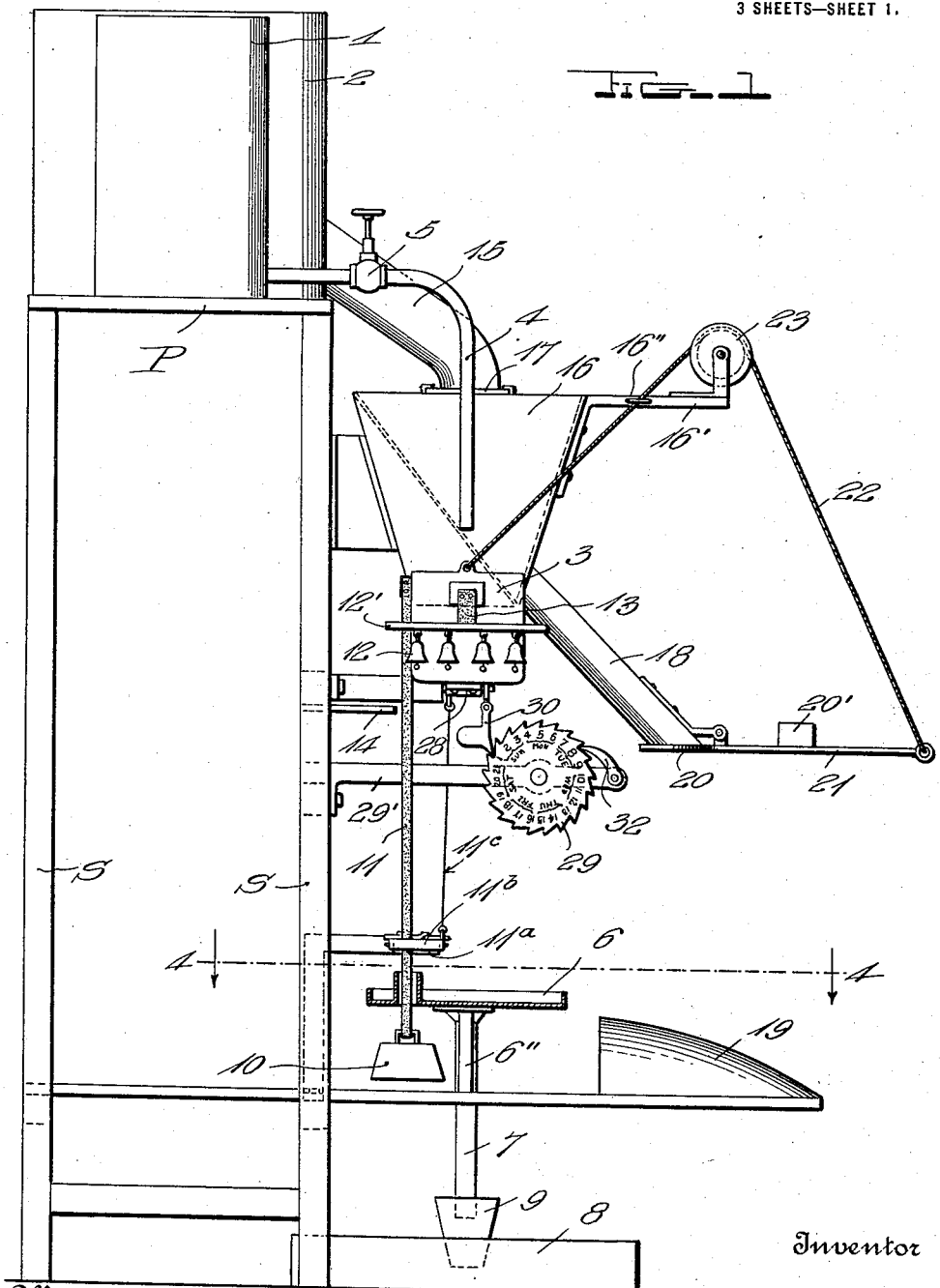

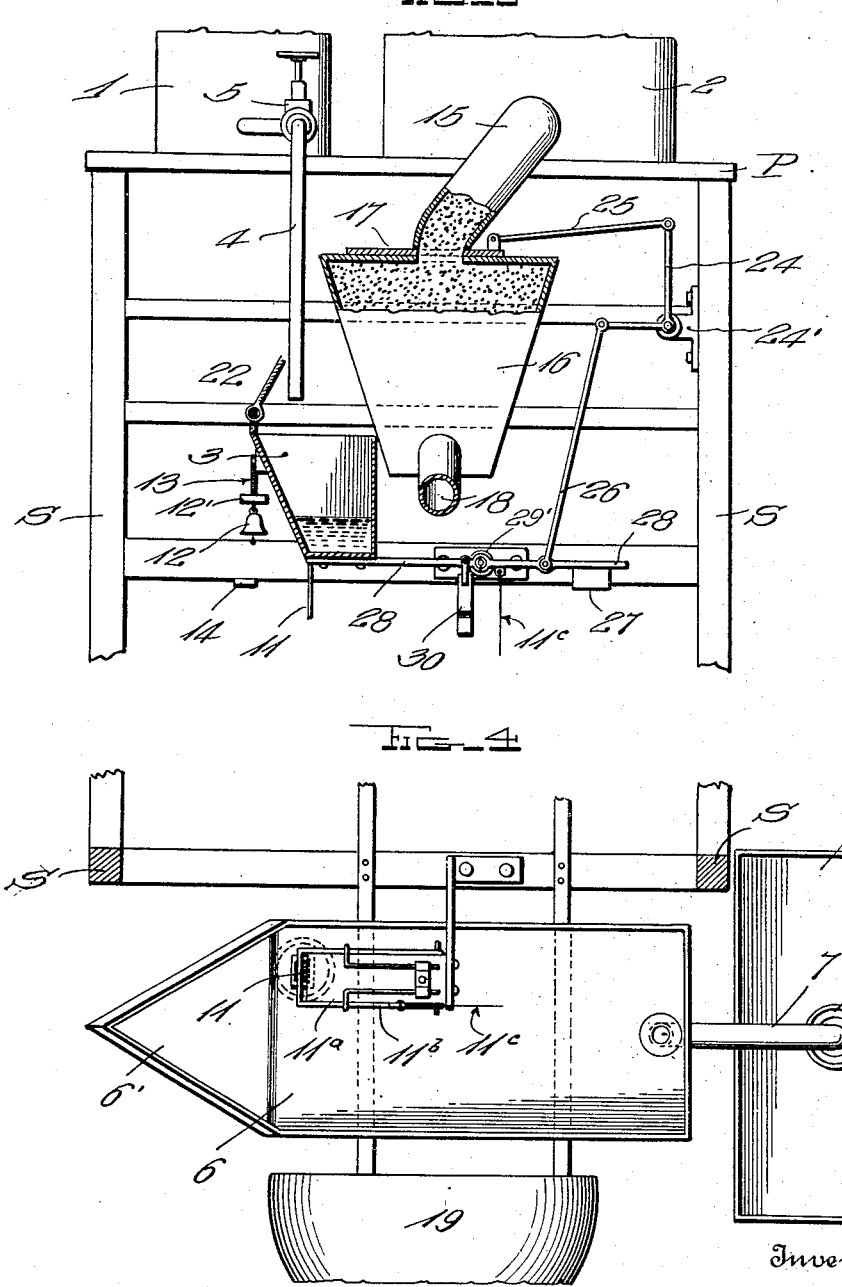

UNITED STATES PATENT OFFICE.

NIKILAS LAPPAS, OF SALEM, MASSACHUSETTS.

AUTOMATIC POULTRY-FEEDER.

1,219,114.　　　Specification of Letters Patent.　　Patented Mar. 13, 1917.

Application filed November 13, 1916. Serial No. 131,099.

*To all whom it may concern:*

Be it known that I, NIKILAS LAPPAS, a subject of the Sultan of Turkey, residing at Salem, in the county of Essex and State of Massachusetts, have invented certain new and useful Improvements in Automatic Poultry-Feeders; and I do declare the following to be a full, clear, and exact description of the invention, such as will enable others skilled in the art to which it appertains to make and use the same.

This invention relates to an automatic feeding apparatus and more especially to a poultry feeding apparatus of this character.

The object of the invention is to provide a simple and efficient apparatus so constructed as to deliver regulated quantities of water and feed at predetermined intervals. Another object is to provide automatic means for cutting off the food supply during the discharge of the water and feed.

With these and other objects in view, the invention consists of the novel features of construction, and the combination and arrangement of parts to be hereinafter more particularly described and claimed.

In the accompanying drawings:

Figure 1 represents a side elevation of a feeding apparatus constructed in accordance with this invention, showing the parts in normally closed position;

Fig. 2 is a front elevation thereof showing the parts closed in full lines and open in dotted lines;

Fig. 3 is a front elevation partly in section; and

Fig. 4 is a horizontal section taken on the line 4—4 of Fig. 1.

The feeder illustrated as an embodiment of this invention includes a water supply tank 1, a feed supply bin 2, a balanced delivery bucket or vessel 3 for delivering the water received from the supply tank, means controlled by the delivery bucket for delivering a supply of feed from a hopper 16, and means controlled by the feed delivery for shutting off the supply from the bin 2 during the discharge of the feed.

The water tank which is here shown in the form of a barrel, and the feed supply bin 2, are mounted on any suitable supporting structure and at a sufficient elevation to provide for the passage by gravity of the water and feed therefrom to the mechanism arranged below for receiving it. As shown, the supporting structure for the members 1 and 2 is in the form of a platform P mounted on standards S, said tank and bin being arranged side by side. A delivery spout 4 leads from the tank 1 and is controlled by a suitable valve 5 which may be so set as to cause the water to be delivered from the spout 4 very slowly, preferably dropping therefrom into the bucket 3, the delivery through the spout 4 being so timed and the size of the bucket 3 so proportioned that it will consume eight hours' time for the filling of said bucket to provide for the filling and emptying thereof three times in twenty-four hours so that the poultry may be supplied regularly at predetermined periods.

A basin or tank 6 is disposed below the bucket 3 and is designed to receive the water discharged therefrom and to deliver it through a conducting pipe 7 to a tank 8 through the medium of an intermediate receptacle 9 shown in the form of a hopper-like vessel which is inserted in the tank 8 and is designed to prevent splashing of the water as it passes from the pipe 7. The basin 6 is made comparatively shallow and has an upturned inclined end 6' positioned to prevent splashing of the water discharged from the bucket 3 and to direct it toward pipe 7. As shown, the basin or tank 6 is supported by suitable standards 6'' in a plane above the tank 8 from which the fowls are designed to drink.

The bucket 3 is mounted for tilting movement in a supporting structure arranged below the tank 1 and as shown has one side flared toward the top, which serves as a spout for delivering the water when the bucket is tilted. A weight 10 is shown connected by a strap or other suitable element 11 with the bucket 3 at one side of the flared mouth thereof, so that when the bucket begins to tilt under the weight of the water, this weight will operate to completely tilt it and cause it to discharge all of its contents. This strap 11 passes between the jaws of a spring catch 11$^a$ which holds it to prevent the weight 10 from tilting the bucket prematurely. The movable jaw 11$^b$ of this catch is connected by a wire 11$^c$ with the bucket in a manner hereinafter to be described, whereby the jaw 11$^b$ is opened on the initial tilting of the bucket.

A plurality of bells or other signal sounding devices 12 are here shown connected with the bucket 3 by means of a cord 13, and an arm 14 is disposed in the path of a bar 12' on which these bells are mounted to afford additional resistance to increase the ringing of the bells which are designed as a signal for the poultry that it is time to feed.

An inclined spout 15 opens downwardly from the bin 2 and discharges into a hopper 16 arranged below it and which is of a size to receive the desired quantity of feed to be distributed. A sliding closure 17 is arranged over the discharge end of the pipe 15 and is adapted to be operated by means to be described for cutting off the supply therethrough at a predetermined interval. A discharge spout 18 leads downwardly from the hopper 16 and is designed to discharge the contents of said hopper onto a convexo-concave tray or delivery plate 19 arranged below said spout and on which the grain or other feed is designed to fall and be scattered in all directions therefrom, said tray being shown inclined downwardly from one end to the other and curved in a plane at right angles to said inclination so that the food falling thereon will scatter over a large area.

A closure 20 is hinged at one end to the discharge end or mouth of the pipe or spout 18 and has an arm 21 extending laterally therefrom with the free end of which is connected an actuating cable 22 which passes over a pulley 23 mounted on an arm 16' which extends laterally from the hopper 16. This cable 22 after it passes over the pulley 23 is extended downwardly through an eye 16" and connected with the bucket 3 so that when the bucket is tilted a pulling action will be exerted on the cable and thereby open the closure 20 of the spout 18 to permit the feed from the hopper 16 to pass outwardly simultaneously with the tilting of the bucket. The closure 20 has a weight 20' beyond its pintle or fulcrum for restoring it to closed position on the righting of the bucket.

A bell crank 24 is fulcrumed at 24' on the supporting structure and is connected at one end by means of a rod 25 with the closure 17 which controls the discharge through the supply pipe 15. Another rod 26 connects the other end of the bell crank 24 with a weighted arm 28 which projects laterally from the bottom of bucket 3 so that on the tilting of the bucket 3, a lifting action is exerted on the rod 26, thereby rocking the bell crank 24, and through the rod 25, drawing the closure 17 forward over the mouth of pipe 15 for cutting off the feed supply, as shown in dotted lines in Fig. 2.

An indicating apparatus in the form of a peripherally notched wheel 29 is mounted to rotate in a bearing mounted on the supporting structure in position to be engaged by a weighted finger or dog 30 which is pivotally mounted on the arm 28. The periphery of the wheel 29 is provided with twenty-one transversely extending notches 31, one of which is engaged by the finger 30 on each tilting of bucket 3 so that the wheel will be revolved one complete revolution in every seven days, when the bucket is tilted three times each twenty-four hours. This wheel 29 also has marked thereon each day of the week and the notches are numbered for each feeding. Hence when bucket 3 tips, the finger 30 on arm 28 pushes the wheel around one notch, the wheel being held against backward movement by a pawl 32 mounted on the wheel supporting bracket 29'. Thus a glance at the wheel will disclose the number of feedings which have been made.

In the use of this improved apparatus when the device has been set with the faucet or cock 5 turned to permit the water to flow from the tank 1 at a speed sufficient to fill the bucket 3 once in eight hours, after said bucket becomes filled, the weight of the water therein will cause it to initially tilt and discharge into the tank 6 arranged below it. This initial tilting of the bucket will operate simultaneously to open the closure 20 of the spout 18 leading from hopper 16, to close the closure 17 which controls the feed supply to said hopper and to open movable jaw 11ᵇ and release strap 11, permitting the weight 10 to complete the tilting of said bucket. While the bucket 3 and the hopper 16 are being emptied, the supply from the bin 2 will be cut off and thus insure the feeding of a predetermined quantity at regular intervals. Each tilting of the bucket also operates to turn wheel 29 one notch in the manner above described.

After the water has been discharged from the bucket 3 which will consume a time sufficient to permit the hopper 16 to be emptied, the bucket will right itself under the action of the weight 27, causing cable 22 to slack and the closure 20 to shut under the action of its weight 20'. The righting of the bucket will also operate to open closure 17 in the manner above described, positioning the parts ready for the next feeding operation which will occur when the bucket 3 has been again filled with water.

I claim:

1. In a poultry feeder, the combination of a supporting structure, a water tank and a food bin mounted thereon and each having a discharge spout, a tilting bucket mounted below the tank spout, a controlling valve for said spout, a hopper disposed below said bin spout, a closure for said bin spout, a discharge spout for said hopper, a pivoted closure for said hopper spout, an actuating cable for said hopper spout closure connected with said bucket and adapted to exert a pulling action on the tilting of the bucket whereby said closure is opened, and connections between said bucket and bin spout closure whereby said closure is closed on the tilting of the bucket.

2. In a poultry feeder, the combination of a supporting structure, a water tank and a food bin mounted thereon and each having a discharge spout, a tilting bucket mounted below the tank spout, a controlling valve for said spout, a hopper disposed below said bin spout, a closure for said bin spout, a discharge spout for said hopper, a pivoted closure for said spout, an actuating cable for said hopper spout closure connected with said bucket and adapted to exert a pulling action on the tilting of the bucket, whereby said closure is opened, a bell crank fulcrumed on said support, a connecting element between one end of said crank and said bin spout closure, and a connection between said bucket and the other end of said crank, whereby the tilting of the bucket will rock the bell crank to close said closure and to open it on the righting of the bucket.

3. An apparatus of the class described including a tilting bucket mounted to automatically tilt on the filling thereof, a weight pendant from said bucket to insure the complete tilting thereof, a weight connected to automatically right the bucket after it empties, and means arranged between said pendant weight and bucket for supporting the weight and normally rendering it inoperative.

4. An apparatus of the class described including a tilting bucket mounted to automatically tilt on the filling thereof, a weight pendant from said bucket to insure the complete tilting thereof, a weight connected to automatically right the bucket after it empties, means for normally rendering said first mentioned weight inoperative, and means operable on the initial tilting of the bucket to bring said weight into operation.

5. An apparatus of the class described including a tilting bucket mounted to automatically tilt on the filling thereof, a weight carrying strap pendant from said bucket to insure the complete tilting of the bucket, a spring clamp normally engaging said strap to hold said weight inoperative, and a connection between said clamp and bucket operable on the initial tilting of the bucket to release said weight.

6. In a feeding apparatus, a supporting structure, an arm fulcrumed thereon intermediate its ends, a bucket carried by one end of said arm and a weight by the other end thereof, a weight pendant from said bucket, means for normally holding said bucket carried weight inoperative, means for supplying water to said bucket at a predetermined speed, and means operable on the initial tilting of the bucket to release said weight holding means.

7. In a feeding apparatus, a supporting structure, a feed hopper mounted thereon, an inlet and a discharge for said hopper, an arm fulcrumed thereon intermediate its ends, a bucket carried by one end of said arm, and a weight by the other end thereof, a weight pendant from said bucket, means for normally holding said bucket carried weight inoperative, means for supplying water to said bucket at a predetermined speed, means operable on the initial tilting of the bucket to release said weight holding means, and means connected with the weighted end of said arm to close the inlet of said hopper when the bucket is tilted and to open it on the righting of the bucket, and means connected with the bucket for opening the hopper discharge on the tilting of said bucket.

In testimony whereof I have hereunto set my hand in the presence of two subscribing witnesses.

NIKILAS LAPPAS.

Witnesses:
JAMES J. TIERNEY,
MARY L. GILLIGAN.

Copies of this patent may be obtained for five cents each, by addressing the "Commissioner of Patents, Washington, D. C."